United States Patent
Kulangara

(10) Patent No.: US 7,417,830 B1
(45) Date of Patent: Aug. 26, 2008

(54) HEAD GIMBAL ASSEMBLY WITH DUAL-MODE PIEZO MICROACTUATOR

(75) Inventor: Sivadasan Kulangara, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 425 days.

(21) Appl. No.: 11/260,990

(22) Filed: Oct. 28, 2005

Related U.S. Application Data

(60) Provisional application No. 60/712,999, filed on Aug. 31, 2005.

(51) Int. Cl.
*G11B 5/56* (2006.01)
*G11B 5/596* (2006.01)

(52) U.S. Cl. .................. 360/294.4; 360/244.5
(58) Field of Classification Search ...... 360/294–294.7, 360/265.7–266.1, 244.5–244.7
See application file for complete search history.

(56) References Cited

U.S. PATENT DOCUMENTS

| | | | |
|---|---|---|---|
| 5,764,444 A * | 6/1998 | Imamura et al. | 360/294.4 |
| 5,793,571 A | 8/1998 | Jurgenson et al. | |
| 5,936,805 A * | 8/1999 | Imaino | 360/294.5 |
| 6,108,175 A | 8/2000 | Hawwa et al. | |
| 6,166,890 A | 12/2000 | Stefansky et al. | |
| 6,201,668 B1 | 3/2001 | Murphy | |
| 6,222,706 B1 | 4/2001 | Stefansky et al. | |
| 6,233,124 B1 * | 5/2001 | Budde et al. | 360/294.4 |
| 6,278,587 B1 | 8/2001 | Mei | |
| 6,292,320 B1 | 9/2001 | Mason et al. | |
| 6,335,848 B1 | 1/2002 | Mei | |
| 6,376,964 B1 | 4/2002 | Young et al. | |
| 6,487,055 B1 | 11/2002 | Mei | |
| 6,493,177 B1 | 12/2002 | Ell et al. | |
| 6,519,107 B1 | 2/2003 | Ehrlich et al. | |
| 6,522,050 B2 | 2/2003 | Sivadasan et al. | |
| 6,574,077 B1 | 6/2003 | Crane et al. | |
| 6,590,748 B2 | 7/2003 | Murphy et al. | |
| 6,597,541 B2 * | 7/2003 | Nishida et al. | 360/294.4 |
| 6,624,553 B2 | 9/2003 | Siviadasan et al. | |
| 6,624,983 B1 | 9/2003 | Berding | |
| 6,653,763 B2 | 11/2003 | Wang et al. | |
| 6,661,618 B2 * | 12/2003 | Fujiwara et al. | 360/294.4 |
| 6,661,619 B2 * | 12/2003 | Nishida et al. | 360/294.4 |
| 6,680,825 B1 | 1/2004 | Murphy et al. | |
| 6,680,826 B2 | 1/2004 | Shiraishi et al. | |
| 6,704,158 B2 | 3/2004 | Hawwa et al. | |
| 6,721,114 B1 | 4/2004 | Chang et al. | |
| 6,728,077 B1 | 4/2004 | Murphy | |

(Continued)

FOREIGN PATENT DOCUMENTS

JP  2000182341 A  *  6/2000

(Continued)

*Primary Examiner*—William J Klimowicz
(74) *Attorney, Agent, or Firm*—Intellectual Property Law Office of Joel D. Voelzke

(57) ABSTRACT

A disk drive suspension has a load beam having a base, a flexure for carrying a slider, and a mount plate. The suspension mount plate has a first portion attachable to an actuator and movable by the actuator as the primary shifting force on the load beam, suitable for larger positioning movements. A second portion of the mount plate is attached to the load beam base and is movable relative to the mount plate first portion. A microactuator moves the second mount plate portion relative to the first mount plate portion as a secondary shifting force on the load beam, suitable for very small positioning movements.

18 Claims, 4 Drawing Sheets

U.S. PATENT DOCUMENTS

| | | | |
|---|---|---|---|
| 6,747,836 B2 | 6/2004 | Stevens et al. | |
| 6,760,194 B2 | 7/2004 | Shiraishi et al. | |
| 6,765,743 B2 | 7/2004 | Goodman et al. | |
| 6,950,287 B2 * | 9/2005 | Nakamura et al. | 360/294.1 |
| 7,038,888 B2 * | 5/2006 | Ma | 360/294.4 |
| 7,061,724 B2 * | 6/2006 | Koganezawa | 360/294.4 |
| 7,110,224 B2 * | 9/2006 | Nakamura et al. | 360/294.1 |
| 7,221,543 B2 * | 5/2007 | Utsunomiya | 360/294.4 |
| 2001/0043443 A1 * | 11/2001 | Okamoto et al. | 360/294 |
| 2002/0030943 A1 * | 3/2002 | Kikkawa et al. | 360/294.3 |
| 2002/0059717 A1 * | 5/2002 | Okada et al. | 29/603.03 |
| 2002/0097528 A1 * | 7/2002 | Williams et al. | 360/294.3 |
| 2002/0118492 A1 * | 8/2002 | Watanabe et al. | 360/294.4 |
| 2003/0142448 A1 * | 7/2003 | Koganezawa | 360/294.4 |
| 2004/0066585 A1 * | 4/2004 | Shum | 360/294.4 |
| 2005/0099736 A1 * | 5/2005 | Utsunomiya | 360/294.4 |
| 2005/0248887 A1 * | 11/2005 | Shimizu et al. | 360/294.4 |
| 2005/0254178 A1 * | 11/2005 | Nakamura et al. | 360/294.4 |

FOREIGN PATENT DOCUMENTS

JP    2000260140 A  *  9/2000

* cited by examiner

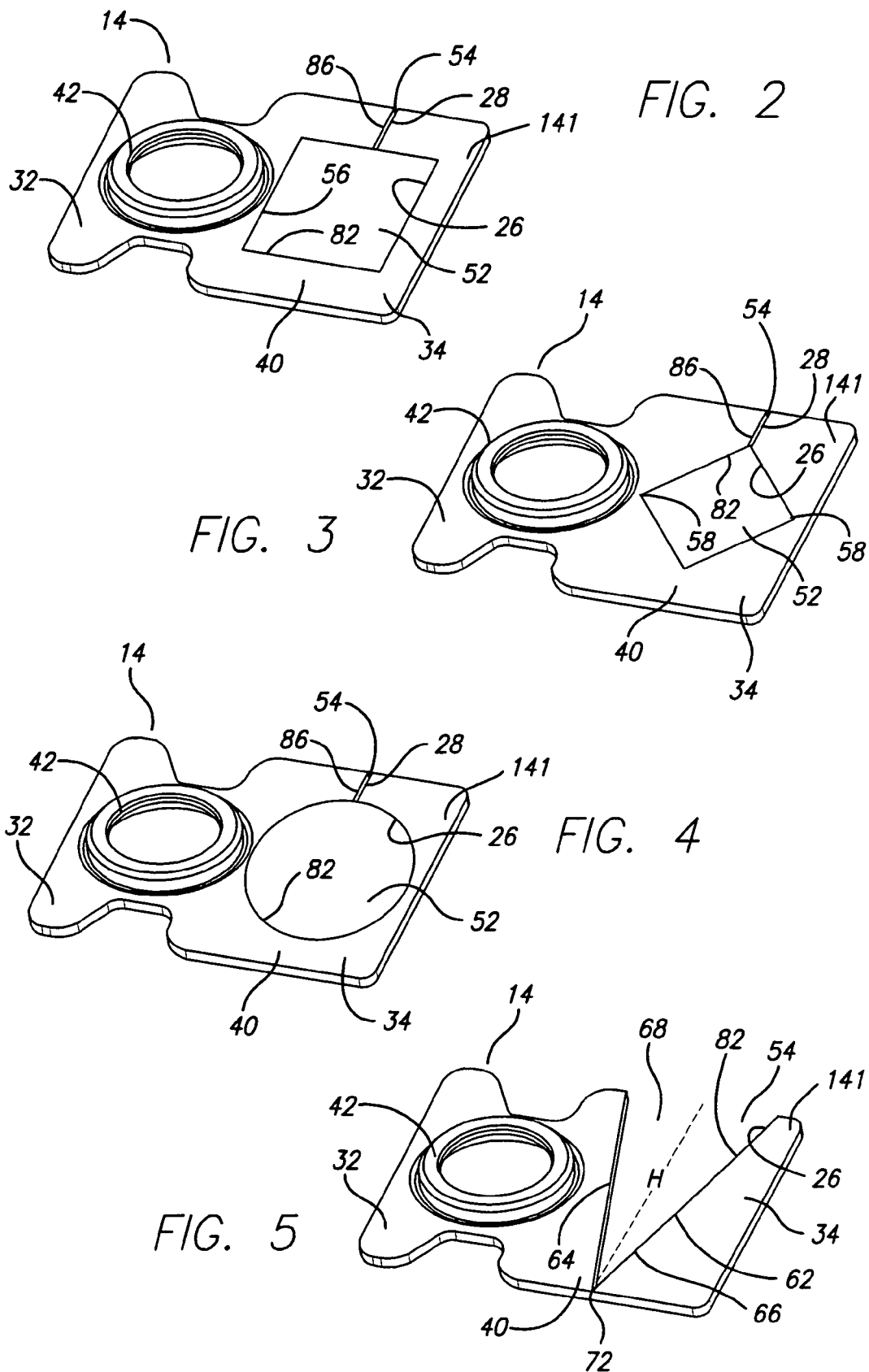

US 7,417,830 B1

HEAD GIMBAL ASSEMBLY WITH DUAL-MODE PIEZO MICROACTUATOR

CROSS-REFERENCE TO RELATED APPLICATIONS

This application claims the benefit of U.S. Provisional Application Ser. No. 60/712,999, filed Aug. 31, 2005.

BACKGROUND OF THE INVENTION

1. Field of the Invention

This invention relates to disk drive suspensions having actuation and microactuation capabilities, and more particularly to suspensions in which the microactuation is effected by a microactuator acting on relatively movable portions of the suspension mount plate. In one embodiment, the suspension mount plate defines a pocket for the microactuator such that dimensional changes in the microactuator relatively shift connected portions of the mount plate to effect microactuated translation of the suspension load beam and flexure.

2. Description of the Related Art

Disk drive suspensions typically include a mount plate that is fixed to an actuator e.g. by staking, and the mount plate is attached to a load beam. The movement of the load beam by the actuator positions the slider carried by the load beam relative to a disk track. For more finely adjusted positioning a microactuator is used, typically a dimensionally variable body responsive to an applied voltage such as a piezoelectric crystal (PZT). These bodies typically provide length-wise or breadth-wise actuation and are generally coupled to the load beam and use hinges to amplify the stroke generated by the microactuator that have been physically separated from the microactuator body. The known relative locations of the load beam, hinge and microactuator body have been problematic. In previous designs, single PZT micro-actuator piezo bodies were not centrally placed with respect to the longitudinal axis of the suspension. The piezo bodies were actuating not in plane with the mount plate of the suspension, and stiffeners (shock absorbers) that minimize the loading effect on piezo ceramics and improve modal frequencies, were necessarily physically separated from the actuator body. Physical separations, however, among the actuator body, hinge and stiffener parts form discontinuities (voids) in the suspension adjacent the mount plate that degrade the dynamic performance, i.e. lower modal frequencies, and adversely affect the shock absorption capabilities of the suspension. Further, asymmetry of mass about the longitudinal axis can cause out-of-plane vibration modes to flare up, as will similarly having the actuation plane not in plane with the mount plate. Stiffeners, provided to improve the shock and dynamic performance of the head gimbal assembly HGA, can, when typically placed distally of the PZT mechanically block the PZT, thus attenuating the mechanical amplification (leverage) inherent in the structure, limiting the attainable stroke levels of the system.

BRIEF SUMMARY OF THE INVENTION

It is an object of the invention, therefore, to provide a new microactuated disk drive suspension and novel and improved methods of manufacturing and operating disk drive suspensions, including a disk drive suspension comprising a mount plate attachable to an actuator and attached to a load beam, the mount plate being locally split proximally of the load beam, and a microactuator attached to the mount plate in split wedging relation to shift said load beam. A further object is to provide a dual mode, dual stage activated suspension for a disk drive comprising a flexure carrying a slider in operative association with a disk, a load beam carrying the flexure, a microactuator motor comprising a breathing mode PZT and a mount plate attaching the load beam to an actuator, the mount plate having a pocket receiving internally or externally the microactuator for deforming the mount plate in slider laterally displacing relation.

It is a further object to provide a disk drive suspension in which the microactuator is centrally placed with respect to the longitudinal axis of the suspension, acts in the plane of the mount plate, and integrates a stiffener. A further object is provision of a microactuated disk drive suspension that does not require discontinuities or voids in the suspension adjacent the mount plate that can degrade the dynamic performance, i.e. lower modal frequencies, and adversely affect the shock absorption capabilities of the suspension. Another object is to provide a microactuated suspension in which the microactuator body is located on suspension longitudinal axis and symmetrically if desired to enable avoidance of out-of-plane vibration modes from asymmetry of mass or an actuation plane not in plane with the mount plate. Other objects include provision of a disk drive suspension comprising a load beam and a mount plate in operative association, and a microactuator arranged in a common or parallel plane to locally shift the mount plate and the load beam thereby in corresponding relation. A further object includes providing a disk drive suspension comprising a load beam and a mount plate in operative association, where the mount plate defines an expandable gap having an interior periphery, a flexible mounting adhesive agent disposed on said interior periphery, and a microactuator mounted in said mount plate in agent contact and arranged for locally shifting said mount plate and correspondingly said load beam. Yet another object includes providing a disk drive suspension comprising a load beam having a base, a flexure on the load beam for carrying a slider, and a mount plate, wherein the mount plate comprises a first portion attachable to an actuator and movable by the actuator in load beam primary shifting relation, a second portion attached to the load beam base and movable relative to the first portion, and a microactuator body for moving the second mount plate portion relative to the first mount plate portion in secondary load beam shifting relation.

These and other objects of the invention to become apparent hereinafter are realized in a disk drive suspension comprising a load beam and a mount plate in operative association, and a microactuator arranged to locally shift the mount plate, the load beam being shifted thereby in corresponding relation.

In this and like embodiments, typically, the microactuator and mount plate are coplanar or in parallel planes, the mount plate is fixed to the microactuator in microactuator stiffening relation, the load beam is free of a separable stiffener, the suspension has a longitudinal axis, the microactuator being located on the longitudinal axis, the microactuator is symmetrical about the longitudinal axis, the mount plate defines a size variable, microactuator-opposing gap, the microactuator being fixed to the mount plate in gap size varying relation to locally shift the mount plate in load beam shifting relation, the mount plate has an interior and a perimeter, the gap having an interior extent within the mount plate interior and an exterior extent extending through the perimeter, the mount plate has a first portion attachable to an actuator and a second portion attached to the load beam, the first and second portions defining the gap therebetween, the second portion being shiftable by the microactuator relative to the first portion, the gap is shaped and sized to define a hinge region at which the second portion is hinged to the first portion for shifting by the microactuator, the microactuator being generally congruent with the gap, the gap exterior extent is opposed to the hinge region, the gap interior extent is generally rectangular and has a side normal to the suspension longitudinal axis, the gap interior extent is located on and symmetrical about the suspension longitudinal axis, the gap interior extent is generally rectangular and has opposed corners located on the suspension longitudinal axis, the gap interior is generally curvilinear, e.g. circular, the gap interior is triangular, the triangular gap defines an isosceles triangle having two sides traversing the suspension longitudinal axis, a base substantially coincident with the mount plate perimeter, and an apex located adjacent the hinge region, the triangular gap has a height, and the height lying normal to the suspension longitudinal axis.

In a further embodiment, the invention provides in a disk drive suspension comprising a load beam and a mount plate in operative association, the combination of a microactuator and the mount plate in coplanar relation.

In this and like embodiments, typically, the mount plate comprises hinged first and second portions jointly defining a gap, the microactuator being located in the gap, there is also included an actuator, the mount plate being attached by its the first portion to the actuator in load beam primary shifting relation, the load beam having a base attached to the second portion in load beam secondary shifting relation, the load beam has a spring portion attached to the base portion and a beam portion supported by the spring portion and supporting a flexure, and there is included a slider carried by the flexure.

In a further embodiment, the invention provides a disk drive suspension comprising a load beam and a mount plate in operative association, and a microactuator arranged to locally shift the mount plate, the load beam being shifted thereby in corresponding relation, the mount plate and microactuator being in coplanar relation.

In this and like embodiments, typically, the mount plate defines a size-variable, microactuator-receiving gap, the microactuator being congruent therewith and mounted therein in gap size varying relation, the mount plate is fixed to the microactuator in microactuator stiffening relation, the load beam is free of a separable stiffener, the suspension has a longitudinal axis, the microactuator being located on the longitudinal axis, the microactuator is symmetrical about the longitudinal axis, the mount plate has an interior and a perimeter, the gap having an interior extent within the mount plate interior and an exterior extent extending through the perimeter, the mount plate has a first portion attachable to an actuator and a second portion attached to the load beam, the first and second portions defining the gap therebetween, the second portion being shiftable by the actuator relative to the first portion, the gap is shaped and sized to define a hinge region beyond the gap interior at which the second portion is hinged to the first portion for shifting by the microactuator, the microactuator being generally congruent with the gap, the gap exterior extent is opposed to the hinge region, the gap interior extent is generally rectangular and has a side normal to the suspension longitudinal axis, the gap interior extent is located on and symmetrical with respect to the suspension longitudinal axis, the gap interior extent is generally rectangular and has opposed corners located on the suspension longitudinal axis, the gap interior is generally curvilinear, e.g. circular, the gap interior is triangular, the triangular gap is an isosceles triangle having two sides traversing the suspension longitudinal axis, a base substantially coincident with the mount plate perimeter, and an apex located adjacent the hinge region, and the triangular gap has a height, the height lying normal to the suspension longitudinal axis.

In a further embodiment, the invention provides a disk drive suspension comprising a load beam and a mount plate in operative association, the mount plate defining an expandable gap having an interior periphery, a flexible mounting adhesive agent disposed on the interior periphery, and a microactuator mounted in the mount plate in agent contact and arranged for locally shifting the mount plate and correspondingly the load beam.

In this and like embodiments, typically, the adhesive agent allows microactuator dimensional change that does not expand the gap, the mount plate has a first portion and a second portion, the first and second portions jointly defining a locus of attachment and a locus of separation, the adhesive agent flexibly binding the first and second portions together at their locus of separation, and the adhesive agent is arranged on the mount plate to dampen vibrations.

In a further embodiment, the invention provides a disk drive suspension comprising a load beam having a base, a flexure on the load beam for carrying a slider, and a mount plate, the mount plate comprising a first portion attachable to an actuator and movable by the actuator in load beam primary shifting relation, a second portion attached to the load beam base and movable relative to the first portion, and a microactuator body for moving the second mount plate portion relative to the first mount plate portion in secondary load beam shifting relation.

In this and like embodiments, typically, the microactuator is fixed to the first and second portions in suspension stiffening and shock resistance—increasing relation, the load beam has a longitudinal axis, the microactuator being disposed on the axis, the microactuator is symmetrically disposed on the longitudinal axis, the microactuator and mount plate are coplanar or in parallel planes, the mount plate first and second portions define a size variable, microactuator opposing gap, the microactuator being fixed to the mount plate in gap size varying relation to locally shift the mount plate in load beam shifting relation, the mount plate first and second portions jointly define a mount plate interior and perimeter, the gap having an interior extent within the mount plate interior and an exterior extent extending through the perimeter, the gap is shaped and sized to define a hinge region at which the second portion is hinged to the first portion for shifting by the microactuator, the microactuator being generally congruent with the gap, the gap exterior extent is opposed to the hinge region, the gap interior extent is generally rectangular and has a side normal to the suspension longitudinal axis, the gap interior extent is located on and symmetrical about the suspension longitudinal axis, is generally rectangular and has opposed corners located on the suspension longitudinal axis, or is generally curvilinear and preferably circular, or triangular, e.g. the triangular gap defines an isosceles triangle having two sides traversing the suspension longitudinal axis, a base substantially coincident with the mount plate perimeter, and an apex located adjacent the hinge region, and the triangular gap has a height lying normal to the suspension longitudinal axis.

In a further embodiment, the invention provides a disk drive suspension comprising a mount plate attachable to an actuator and attached to a load beam, the mount plate being locally split proximally of the load beam, and a microactuator attached to the mount plate in split wedging relation to shift the load beam.

In a further embodiment, the invention provides a dual mode, dual stage-activated suspension for a disk drive comprising a flexure carrying a slider in operative association with a disk, a load beam carrying the flexure, a microactuator motor comprising a breathing mode PZT and a mount plate attaching the load beam to an actuator, the mount plate receiving internally in a pocket, or externally, the microactuator motor for deforming the mount plate in slider laterally displacing relation.

In its method aspects the invention includes a method of manufacturing a disk drive suspension, including locally splitting a mount plate to be attached to an actuator, attaching a load beam to the mount plate distally of the local splitting, and attaching a microactuator to the mount plate in wedging relation to the local splitting to shift the load beam attached to the mount plate responsive to the microactuator wedging, a method of operating a disk drive suspension, including dividing a mount plate into relatively movable and immovable portions, hinging the portions at a first locus, spacing the portions at a second locus at a proximity, attaching a load beam to the movable portion for movement therewith, and varying the proximity of the portions with a microactuator in load beam moving relation, and a method of microactuating a load beam supported by a mount plate having relatively movable first and second portions, including carrying the load beam on the second portion, and moving the second portion relative to the first portion with a microactuator.

BRIEF DESCRIPTION OF THE SEVERAL VIEWS OF THE DRAWINGS

The invention will be further described in conjunction with the attached drawings in which:

FIG. 2 is an oblique view of a mount plate in a first embodiment;

FIG. 3 is a view like FIG. 2 of a further embodiment;
FIG. 4 is a view like FIG. 2 of a further embodiment;
FIG. 5 is a view like FIG. 2 of a further embodiment.

DETAILED DESCRIPTION OF THE INVENTION

Figure 1:
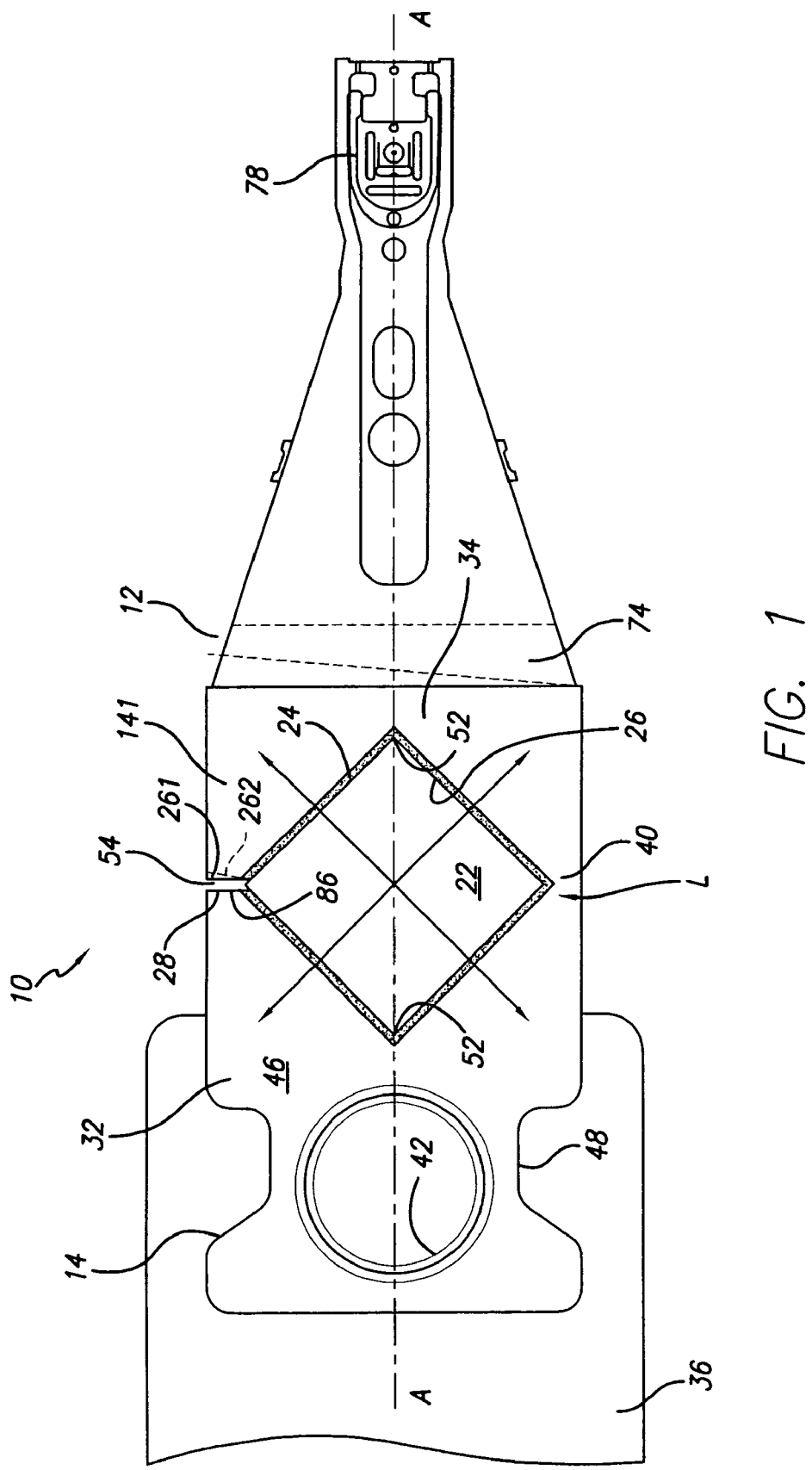
FIG. 1 is a top plan view of a disk drive suspension according to the invention.

In accordance with the invention, a breathing-mode piezo microactuator is embedded in parallel or in plane with the mount plate of the suspension. All four vertical sides (vertical edges or horizontal edge margins) of the PZT are engaged to the mount plate via adhesives and work in tandem both in the $d_{31}$ and the $d_{32}$ modes, i.e. lengthwise and widthwise, see arrows in FIG. 1.

With reference now to the drawings in detail, in FIGS. 1-11 the invention disk drive suspension 10 comprises a load beam 12 and a mount plate 14 in operative association for carrying a slider 18 (FIG. 6) at a disk surface (not shown), and a microactuator 22 arranged to locally shift the mount plate and the load beam thereby in corresponding relation over a disk surface.

Figure 9:
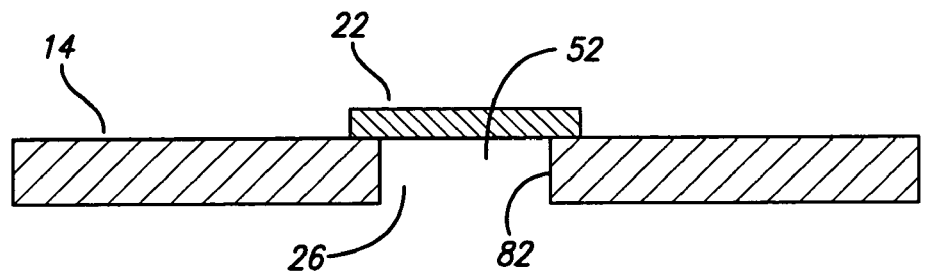
Figure 10:
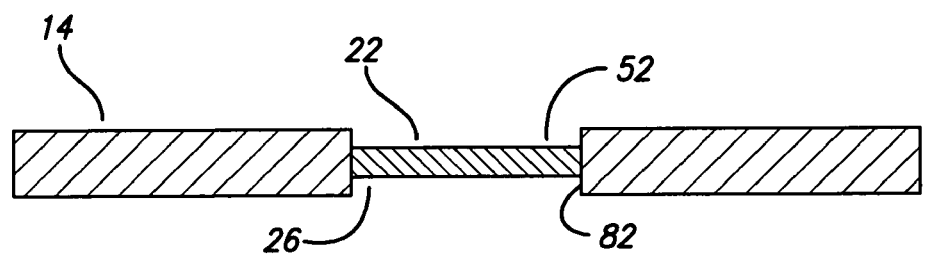

Microactuator 22 and mount plate 14 can be coplanar (FIGS. 6-8 and 10-11), or in parallel planes (FIG. 9). Mount plate 14 can be rigidly fixed to the microactuator 22 with an adhesive or bonding agent 24 whereby the mount plate tends to stiffen the microactuator. In preferred embodiments, the load beam 12 is free of a separable stiffener.

Figure 6:
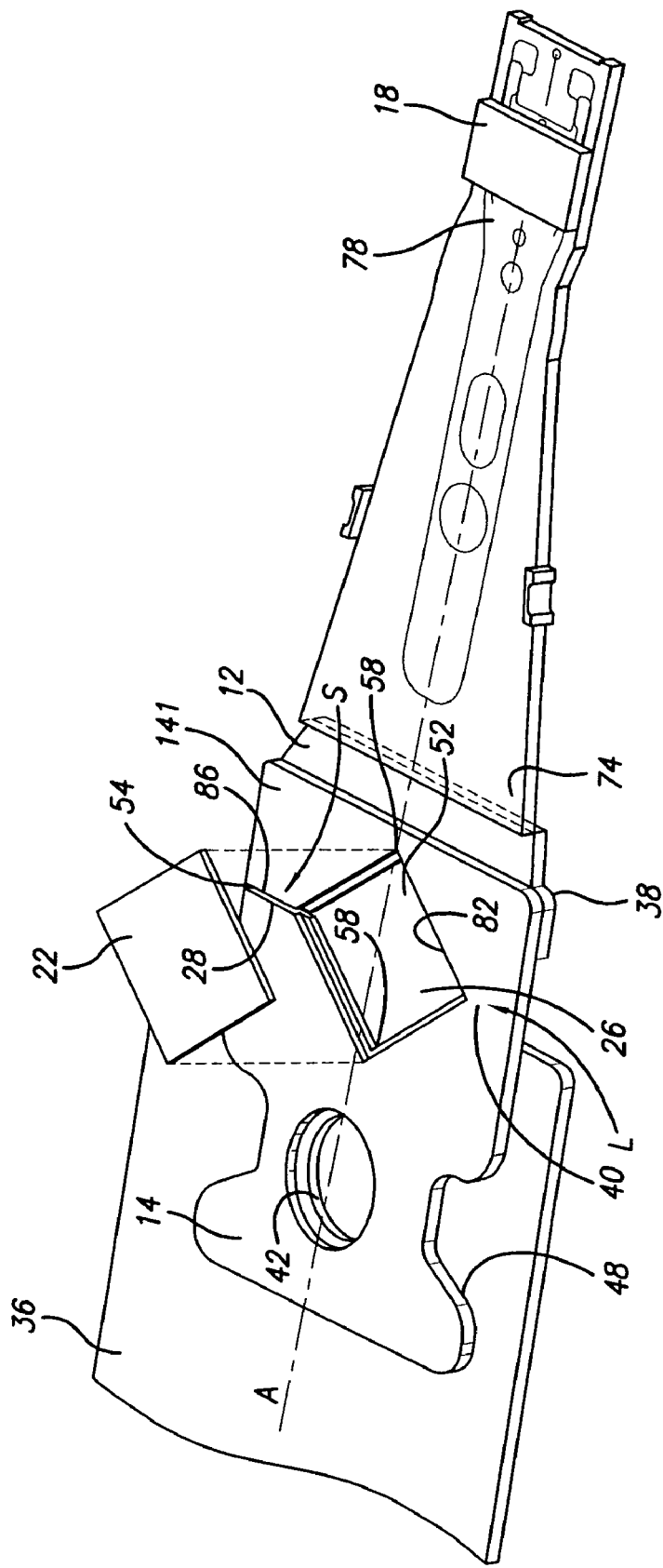
FIG. 6 is an oblique view of an exploded oblique view of a suspension according to the invention.
Figure 7:
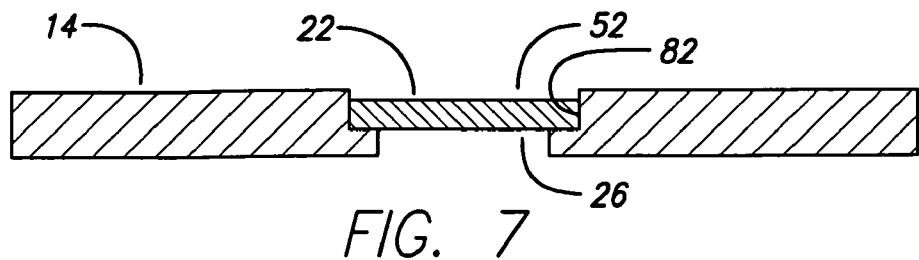
FIGS. 7-11 are fragmentary views in vertical section of assemblies of microactuators and mount plate portions.
Figure 8:
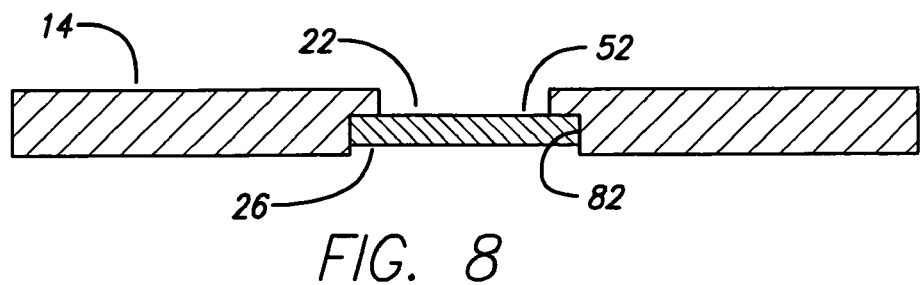

Suspension 10 has a longitudinal axis A-A and microactuator 22 is preferably located on that axis, Further preferred is locating the microactuator 22 to be symmetrical about the longitudinal axis, e.g. as shown in FIGS. 1 and 6, for reasons noted above.

Mount plate 14 defines a size-variable, microactuator-opposing gap 26. Microactuator 22 is fixed to the mount plate 14 in or at gap 26 by bonding agent 24 in gap size varying relation (as shown in FIG. 1) between an initial, unexpanded gap 261 and an expanded gap 262 (exaggerated in the Figure for clarity) as gap kerf 28 is spread by movement of movable mount plate portion 34 relative to stationary mount plate portion 32 (fixed to an actuator 36 by staking at 42) about hinge 40 connecting the portions. This relative movement of mount plate portions 32, 34 shifts a local part 141 of mount plate 14, and thus locally shifts the moving portion 34 of the mount plate 14. The local shifting of mount plate portion 34 shifts correspondingly the load beam 12 since the movable portion 34 is attached to the load beam by attachment to load beam base 38 (FIG. 6).

More particularly, mount plate 14 has an areal interior 46 and a perimeter 48. Mount plate gap 26 has an interior extent 52 within the mount plate interior 46 and an exterior extent 54 extending through the perimeter 48. Mount plate 14, as noted, comprises first portion 32 attachable to actuator 36 (for first mode, first stage activation, larger movements of the mount plate and load beam) and second portion 34 attached to the load beam 12, the first and second portions defining the gap 26 therebetween with the second portion being shiftable by the microactuator 22 relative to the first portion for second mode, second stage activation. Gap 26 is shaped and sized as shown to define a hinge region 40 at which the second portion 34 is hinged to the first portion 32 for shifting by the microactuator 22. Microactuator 22 is generally congruent with the gap 26. Gap exterior extent 54 is directly or indirectly opposed to the hinge region 40. Gap interior extent 52 can be generally rectangular or square, and have a side 56 normal to the suspension longitudinal axis A-A with the gap interior extent 52 located on and symmetrical about the suspension longitudinal axis, as shown in FIGS. 1 and 2. A rectangular gap interior extent 52 can also have its opposed corners 58 located on the suspension longitudinal axis A-A, a shown in FIGS. 3 and 6. Alternatively, the gap interior extent 52 can be generally curvilinear, e.g. circular as shown in FIG. 4. Further, gap interior extent 52 can be triangular as shown in FIG. 5. Preferably, a triangular gap interior extent 52 defines an isosceles triangle 62 having two sides 64, 66 traversing the suspension longitudinal axis A-A, a base 68 substantially coincident with the mount plate perimeter 48, and an apex 72 located adjacent the hinge region 40. Further preferably a triangular gap interior extent 52 has a height H lying normal to the suspension longitudinal axis A-A.

In a further embodiment, and with further reference to FIGS. 1-8 and 10-11 the invention provides in a disk drive suspension 10 comprising a load beam 12 and a mount plate 14 in operative association, the combination of a microactuator 22 and the mount plate in coplanar relation. In this embodiment the mount plate 14 comprises hinged first and second portions 32, 34 jointly defining a gap 26, the microactuator 22 being located in the gap. Mount plate 14 is attached by its first portion 32 to the actuator 36 in load beam 12 primary shifting relation, i.e. initial positioning of the load beam and its slider 18 relative to a disk surface. Load beam 12 has its base 38 attached to the second portion 34 in load beam secondary shifting relation, i.e. for fine positioning of the load beam and slider 18. Load beam 12 has a spring portion 74 attached to the base portion 38 and a beam portion supported by the spring portion and supporting a flexure 78. The slider 18 is carried by the flexure 78.

In a further embodiment, the invention disk drive suspension 10 comprises load beam 12 and mount plate 14 in operative association, and microactuator 22 arranged to locally shift the mount plate, the load beam being shifted thereby in corresponding relation, wherein the mount plate and microactuator are in coplanar relation.

In this as in previous embodiments, the mount plate 14 defines a size-variable, microactuator-receiving gap 26. Microactuator 22 is congruent with gap 26 and mounted therein in gap size varying relation. Mount plate 14 is fixed to the microactuator 22 in microactuator stiffening relation and the load beam 12 is free of a separable stiffener. Suspension 10 has a longitudinal axis A-A. Preferably, microactuator 22 is located on the longitudinal axis A-A. Microactuator 22 is further preferably located to be symmetrical about the longitudinal axis A-A.

Mount plate 14 has an interior 46 and a perimeter 48. Gap 26 has an interior extent 52 within the mount plate interior 46 and an exterior extent 54 extending through the perimeter 48. Mount plate 14 has a first portion 32 attachable to an actuator 36 and a second portion 34 attached to the load beam 12. First and second mount plate portions 32, 34 define the gap 26 therebetween. Second portion 34 is shiftable by the actuator 36 relative to the first portion 32.

Gap 26 is shaped and sized to define a hinge region 40 beyond the gap interior 52 at which the second portion 34 is hinged to the first portion 32 for shifting by the microactuator 22. Microactuator 22 is generally congruent with the gap 26 with gap exterior extent 54 opposed to the hinge region 40. Gap interior extent 52 is rectangular, circular or triangular as previously described and disposed as shown in FIGS. 1-11.

Figure 11:
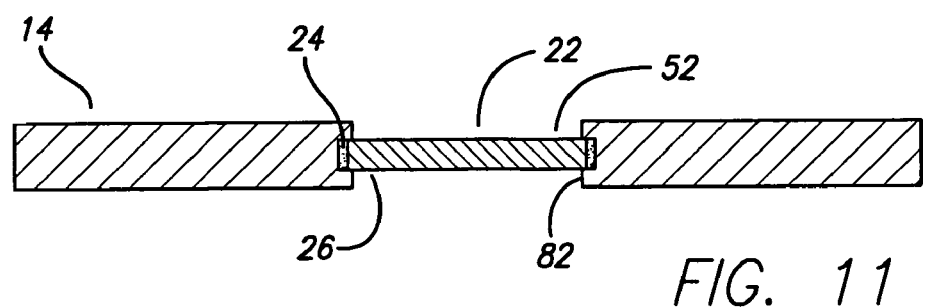

With reference particularly to FIGS. 1, 6 and 11, the invention disk drive suspension 10 in a further embodiment comprises load beam 12 and a mount plate 14 in operative association with the mount plate defining an expandable gap 26 having an interior periphery 82, a flexible mounting adhesive agent 24 disposed on the interior periphery to bond the microactuator 22 in place without fully constraining the microactuator against small movements before acting on the periphery and the mount plate portions 32, 34. As is previous embodiments, however, microactuator 22 is mounted in or on the mount plate 14 in agent 24 contact and arranged for locally shifting the mount plate and correspondingly the load beam 12.

Thus, adhesive agent 24 allows microactuator 22 dimensional change that does not expand the gap 26. Mount plate 14 has a first portion 32 and a second portion 34, the first and second portions jointly defining a locus of attachment L corresponding to hinge region 40 and a locus of separation S corresponding to kerf 28. Adhesive agent 24 flexibly binds the first and second portions 32, 34 together at their locus of separation S. Preferably, adhesive agent 24 is arranged on the mount plate in a manner to dampen vibrations.

The invention further provides a disk drive suspension 10 comprising a load beam 12 having a base 38, a flexure 78 on the load beam for carrying a slider 18, and a mount plate 14. Mount plate 14 comprises a first portion 32 attachable to an actuator 36 and movable by the actuator in load beam primary shifting relation, a second portion 34 attached to the load beam base and movable relative to the first portion, and a microactuator body 22 for moving the second mount plate portion relative to the first mount plate portion in secondary load beam shifting relation.

In general in this embodiment, the microactuator 22 is fixed to the first and second portions 32, 34 in suspension 10 stiffening and shock resistance—increasing relation, load beam 12 has a longitudinal axis A-A, the microactuator being disposed on the axis, and preferably symmetrically disposed thereon. The microactuator 22 and mount plate 14 are coplanar or in parallel planes (See FIGS. 7-11). Mount plate first and second portions 32, 34 define a size variable, microactuator opposing gap 26, the microactuator being fixed to the mount plate 14 in gap size varying relation to locally shift the mount plate in load beam 12 shifting relation. Mount plate first and second portions 32, 34 jointly define a mount plate interior 46 and perimeter 48. Gap 26 has an interior extent 52 within the mount plate interior 46 and an exterior extent 54 extending through the perimeter 48. Gap 26 is shaped and sized to define hinge region 40 at which the second portion is hinged to the first portion for shifting by the microactuator 22 which is generally congruent with the gap 26. Gap exterior extent 54 is opposed to the hinge region 40 and the gap interior extent 52 is shaped and disposed as shown in FIGS. 1-11 and above described.

In a further embodiment, the invention disk drive suspension 10 comprising mount plate 14 attachable to an actuator 36 and attached to a load beam 12 is characterized by the mount plate being locally split at 28 proximally of the load beam, and having a microactuator 22 attached to the mount plate in split wedging relation to shift the load beam. In a further embodiment, the invention suspension 10 is a dual mode, dual stage-activated suspension for a disk drive and comprises a flexure 78 carrying a slider 18 for operative association with a disk, a load beam 12 carrying the flexure, a microactuator motor 22 comprising a breathing mode PZT and a mount plate 14 attaching the load beam to an actuator 36, the mount plate receiving internally in a pocket, or externally, the microactuator motor for deforming the mount plate in slider laterally displacing relation.

The invention method of manufacturing a disk drive suspension 10, includes locally splitting at 28 a mount plate 14 to be attached to an actuator 36, attaching a load beam 12 to the mount plate distally of the local splitting, and attaching a microactuator 22 to the mount plate in wedging relation to the local splitting to shift the load beam 12 attached to the mount plate responsive to the microactuator wedging.

The invention method of operating a disk drive suspension 10, includes dividing a mount plate 14 into relatively movable and immovable portions 34, 32, hinging the portions at a first locus 40, spacing the portions at a second locus 28 at a proximity 86, attaching a load beam 12 to the movable portion 34 for movement therewith, and varying the proximity of the portions with a microactuator 22 in load beam moving relation.

The invention method of microactuating a load beam 12 supported by a mount plate 14 having relatively movable first and second portions 32, 34, includes carrying the load beam on the second portion, and moving the second portion relative to the first portion with a microactuator 22.

The invention thus provides a new microactuated disk drive suspension and novel and improved, methods of manufacturing and operating disk drive suspensions, including a disk drive suspension comprising a mount plate attachable to an actuator and attached to a load beam, the mount plate being locally split proximally of the load beam, and a microactuator attached to the mount plate in split wedging relation to shift said load beam.

The invention further provides a disk drive suspension in which the microactuator is centrally placed with respect to the longitudinal axis of the suspension, acts in the plane of the mount plate, integrates a stiffener, and does not require discontinuities or voids in the suspension adjacent the mount plate that can degrade the dynamic performance, i.e. lower modal frequencies, and adversely affect the shock absorption capabilities of the suspension. Additionally provided is a microactuated suspension in which the microactuator body is located on suspension longitudinal axis and symmetrically if desired to enable avoidance of out-of-plane vibration modes from asymmetry of mass or an actuation plane not in plane with the mount plate. OThe foregoing objects are thus met.

I claim:

1. A disk drive suspension comprising:
a load beam;
a mount plate in operative association with the load beam;
a microactuator arranged to locally shift the mount plate, the load beam being shifted thereby in corresponding relation;
wherein the mount plate defines a size variable, microactuator opposing gap, the microactuator being fixed to the mount plate in gap size varying relation to locally shift the mount plate in load beam shifting relation;
wherein the mount plate has an interior and a perimeter, the gap having an interior extent within the mount plate interior and an exterior extent extending through the perimeter;
wherein the mount plate has a first portion attachable to an actuator and a second portion attached to the load beam, the first and second portions defining the gap therebetween, the second portion being shiftable by the microactuator relative to the first portion;
wherein the gap is shaped and sized to define a hinge region at which the second portion is hinged to the first portion for shifting by the microactuator, the microactuator being generally congruent with the gap;
wherein the gap exterior extent is opposed to the hinge region.

2. A disk drive suspension comprising:
a load beam;
a mount plate in operative association with the load beam;
a microactuator arranged to locally shift the mount plate, the load beam being shifted thereby in corresponding relation;
wherein the mount plate defines a size variable, microactuator opposing gap, the microactuator being fixed to the mount plate in gap size varying relation to locally shift the mount plate in load beam shifting relation;
wherein the mount plate has an interior and a perimeter, the gap having an interior extent within the mount plate interior and an exterior extent extending through the perimeter;
wherein the mount plate has a first portion attachable to an actuator and a second portion attached to the load beam, the first and second portions defining the gap therebetween, the second portion being shiftable by the microactuator relative to the first portion;
wherein the gap is shaped and sized to define a hinge region at which the second portion is hinged to the first portion for shifting by the microactuator, the microactuator being generally congruent with the gap;
wherein the gap interior extent is generally rectangular and has opposed corners located on a central longitudinal axis of the suspension.

3. A disk drive suspension comprising:
a load beam;
a mount plate in operative association with the load beam;
a microactuator arranged to locally shift the mount plate, the load beam being shifted thereby in corresponding relation, the mount plate and microactuator being in coplanar relation;
wherein the mount plate defines a size-variable, microactuator-receiving gap, the microactuator being congruent therewith and mounted therein in gap size varying relation;
wherein the mount plate has an interior and a perimeter, the gap having an interior extent within the mount plate interior and an exterior extent extending through the perimeter;
wherein the mount plate has a first portion attachable to an actuator and a second portion attached to the load beam, the first and second portions defining the gap therebetween, the second portion being shiftable by the microactuator relative to the first portion;
wherein the gap is shaped and sized to define a hinge region beyond the gap interior at which the second portion is hinged to the first portion for shifting by the microactuator, the microactuator being generally congruent with the gap;
wherein the gap exterior extent is opposed to the hinge region.

4. A disk drive suspension comprising:
a load beam;
a mount plate in operative association with the load beam;
a microactuator arranged to locally shift the mount plate, the load beam being shifted thereby in corresponding relation, the mount plate and microactuator being in coplanar relation;
wherein the mount plate defines a size-variable, microactuator-receiving gap, the microactuator being congruent therewith and mounted therein in gap size varying relation;
wherein the mount plate has an interior and a perimeter, the gap having an interior extent within the mount plate interior and an exterior extent extending through the perimeter;
wherein the mount plate has a first portion attachable to an actuator and a second portion attached to the load beam, the first and second portions defining the gap therebetween, the second portion being shiftable by the microactuator relative to the first portion;
wherein the gap is shaped and sized to define a hinge region beyond the gap interior at which the second portion is hinged to the first portion for shifting by the microactuator, the microactuator being generally congruent with the gap;
wherein the gap interior extent is generally rectangular and has opposed corners located on a central longitudinal axis of the suspension.

5. A disk drive suspension comprising:
a load beam;
a mount plate in operative association with the load beam;
the mount plate defining an expandable gap having an interior periphery, a flexible mounting adhesive agent disposed on the interior periphery, and a microactuator mounted in the mount plate in agent contact and arranged for locally shifting the mount plate and correspondingly the load beam;
wherein the mount plate has a first portion and a second portion, the first and second portions jointly defining a locus of attachment and a locus of separation, the adhesive agent flexibly binding the first and second portions together at their locus of separation.

6. A disk drive suspension of claim 5 wherein the adhesive agent is arranged on the mount plate to dampen vibrations.

7. A disk drive suspension of claim 5 wherein the microactuator is symmetrically disposed on a central longitudinal axis of the suspension.

8. A disk drive suspension comprising:
a load beam;
a mount plate in operative association with the load beam;

a microactuator arranged to locally shift the mount plate, the load beam being shifted thereby in corresponding relation;

wherein the mount plate defines a size variable, microactuator opposing, continuous gap, the microactuator being fixed to the mount plate in gap size varying relation to locally shift the mount plate in load beam shifting relation;

wherein the mount plate has an interior and a perimeter, the gap having an interior extent within the mount plate interior and an exterior extent extending through the perimeter, wherein the suspension has a central longitudinal axis, the microactuator being disposed on the axis, the microactuator being generally congruent with the gap.

9. A disk drive suspension of claim 8 wherein:

the mount plate has a first portion attachable to an actuator and a second portion attached to the load beam, the first and second portions defining the gap therebetween, the second portion being shiftable by the microactuator relative to the first portion;

the gap is shaped and sized to define a hinge region at which the second portion is hinged to the first portion for shifting by the microactuator, the microactuator being generally congruent with the gap.

10. A disk drive suspension of claim 9 wherein the gap exterior extent is opposed to the hinge region.

11. A disk drive suspension of claim 9 wherein the gap interior extent is generally rectangular and has opposed corners located on a central longitudinal axis of the suspension.

12. A disk drive suspension comprising:

a load beam;

a mount plate in operative association with the load beam;

a microactuator arranged to locally shift the mount plate, the load beam being shifted thereby in corresponding relation, the mount plate and microactuator being in coplanar relation;

wherein the mount plate defines a size-variable, microactuator-receiving gap, the microactuator being congruent therewith and mounted therein in gap size varying relation;

wherein the mount plate has an interior and a perimeter, the gap having an interior extent within the mount plate interior and an exterior extent extending through the perimeter, wherein the suspension has a central longitudinal axis, the microactuator being disposed on the axis.

13. A disk drive suspension of claim 12 wherein:

the mount plate has a first portion attachable to an actuator and a second portion attached to the load beam, the first and second portions defining the gap therebetween, the second portion being shiftable by the microactuator relative to the first portion;

the gap is shaped and sized to define a hinge region beyond the gap interior at which the second portion is hinged to the first portion for shifting by the microactuator, the microactuator being generally congruent with the gap.

14. A disk drive suspension of claim 13 wherein the gap exterior extent is opposed to the hinge region.

15. A disk drive suspension of claim 13 wherein the gap interior extent is generally rectangular and has opposed corners located on a central longitudinal axis of the suspension.

16. A disk drive suspension comprising:

a load beam;

a mount plate in operative association with the load beam;

a microactuator arranged to locally shift the mount plate, the load beam being shifted thereby in corresponding relation, the mount plate and microactuator being in coplanar relation;

wherein the mount plate defines a size-variable, microactuator-receiving gap, the microactuator being congruent therewith and mounted therein in gap size varying relation;

wherein the suspension has a central longitudinal axis, the microactuator being located on the longitudinal axis.

17. A disk drive suspension comprising:

a load beam;

a mount plate in operative association with the load beam;

the mount plate defining an expandable gap having an interior periphery, a flexible mounting adhesive agent disposed on the interior periphery, and a microactuator mounted in the mount plate in agent contact and arranged for locally shifting the mount plate and correspondingly the load beam;

wherein the load beam has a central longitudinal axis, the microactuator being disposed on the axis, the microactuator being generally congruent with the gap.

18. A disk drive suspension comprising:

a mount plate having:

a gap, the gap having an interior periphery within an interior of the mount plate, the gap having an exterior extent extending through a perimeter of the mount plate, the gap extending continuously from the interior periphery to the exterior extent; and a hinge region defined by the gap, the hinge region opposed to the gap exterior extent;

a microactuator affixed within the gap interior periphery and arranged to locally shift the mount plate in gap size varying relation, wherein the suspension has a central longitudinal axis, the microactuator being disposed on the axis, the microactuator being generally congruent with the gap.

* * * * *